July 25, 1961 — D. N. GOLDBERG — 2,993,577
FRICTION UNIT ASSEMBLY FOR BRAKE OR CLUTCH STRUCTURES
Filed March 11, 1958
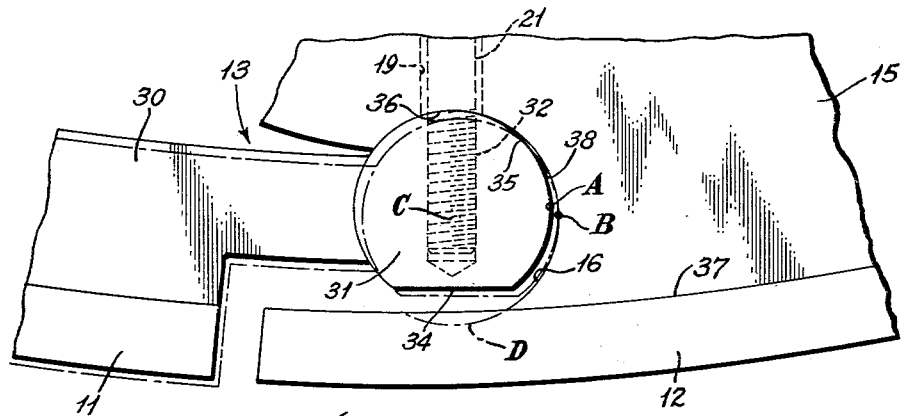
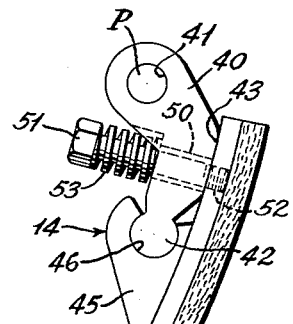
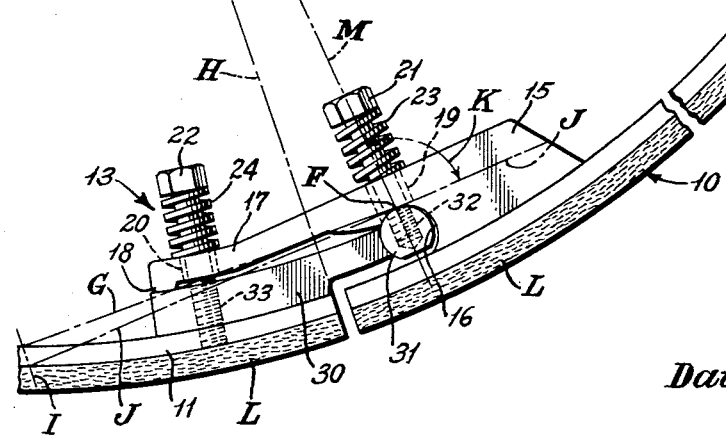
INVENTOR
David N. Goldberg
BY Burns, Doane, Benedict & Irons
ATTORNEYS

United States Patent Office 2,993,577
Patented July 25, 1961

2,993,577
FRICTION UNIT ASSEMBLY FOR BRAKE OR CLUTCH STRUCTURES
David N. Goldberg, 1510 Main St., Wheeling, W. Va.
Filed Mar. 11, 1958, Ser. No. 720,696
3 Claims. (Cl. 192—107)

This invention relates generally to an improved friction unit assembly for use in conjunction with brake or clutch structures. More particularly it is directed to a sectionalized friction unit assembly embodying two or more pivotally interconnected arcuate shoe sections and a link connector interposed between the endmost shoe section and the stationary mounting for the assembly on the brake or clutch structure.

For effective braking or clutching action, the importance of seeking uniform distribution of pressures over the surface of the brake lining material as it engages the drum has long been recognized. Ideally, such uniform pressure is achieved by simultaneous engagement of the brake lining at all points with the drum. Thereafter, as additional brake actuating force is applied, the pressure build up is desirably uniform over the area of the brake lining material. In the absence of these theoretically ideal lining engagement conditions, high pressure points and resulting hot spots occur at various locations over the lining surface. As a consequence thereof, rapid wear of the lining, overheating of the brake or clutch structure and reduced life thereof takes place.

In development of the instant invention, achieving the desired objective of uniform engagement with the brake or clutch drum is sought by providing a sectionalized friction unit assembly wherein the lining material is carried on the arcuate surfaces of pivotally connected shoe sections. The pivotal connection between the shoe sections incorporates a pin carried by one section and having an arcuately curved segment engaged with a socket carried by another section wherein the socket has an arcuate configuration of a radius greater than the radius of the arcuately curved segment of the pin. In this invention the arcuate configuration of the socket is disposed in a particular relation to the inner surface of the shoe section with which it is associated so that in actuation of the assembly the respective shoe sections will be moved smoothly and uniformly into engagement with the drum surface to effect the braking or clutching action.

The friction unit assembly of this invention also embodies a link connection between the endmost shoe section and the stationary mounting on the brake or clutch structure. This link connection incorporates abutment means cooperating between the shoe section and the link, and spring means biasing the link toward parallelism with the shoe section.

It is a primary object of the instant invention to provide an improved sectionalized friction unit assembly for use with brake or clutch structures wherein effective braking or clutching pressures will be applied more uniformly with ease of operation of the structure.

It is another primary object of this invention to provide a friction unit assembly incorporating spring biased link connecting means for pivotally fastening the end of the assembly to a stationary mounting on the brake or clutch structure.

It is also an object of this invention to provide a friction unit assembly embodying a link pivotally connected adjacent one end of the assembly and to be pivotally connected to a stationary pin on the brake or clutch structure with a spring urging an abutment intermediate such pivotal connections into engagement with the end of the assembly.

A further object of this invention is to provide a friction unit assembly having pivotally interconnected sections wherein a pin having an arcuately curved segment on one section engages with a socket on another section, with the socket having an arcuate configuration of a radius greater than the radius of such arcuately curved segment of the pin.

An additional object of this invention is to provide a sectionalized friction unit assembly in accordance with the above object wherein the center of the arcuate configuration of the socket is disposed at a point spaced radially inwardly from the inner surface of the shoe section less than the radius of such arcuate configuration.

The above and more specific objects of the instant invention will become apparent by reference to the detailed description given hereinafter with respect to a specific embodiment of this invention. It will be appreciated that the embodiment hereinafter described and illustrated on the drawing, is only illustrative of the application of this invention and that within the scope of the appended claims various modifications of the invention are contemplated. Reference will now be had to the drawing which forms a part of this application and in which:

FIGURE 1 is a fragmentary side elevational view of a friction unit assembly made in accordance with the instant invention, and FIGURE 2 is an enlarged elevational view showing details of the pivotal connection employed between the shoe sections in the assembly of FIGURE 1.

Referring to FIGURE 1 on the drawing, a friction unit assembly 10 is shown made up of arcuate shoe sections 11 and 12. For ease of illustration, only a portion of the shoe section 11 is shown. It will be appreciated that the complete assembly may be made up of more than two pivotally interconnected shoe sections. Where the assembly consists of only two sections, the section 11 will be provided, at the opposite end thereof, with suitable means (not shown) for connection to the actuating mechanism of the brake or clutch structure. Such actuating mechanisms are well known and form no part of the instant invention.

Pivotal interconnecting means 13 is provided between the adjoining ends of sections 11 and 12 to retain such sections in end to end relation. Such means permits limited controlled pivotal movement between the sections as the lining L, secured to the outer arcuate surfaces of the sections, is moved into engagement with the brake or clutch drum (not shown).

The end of section 12 opposite interconnecting means 13 forms the "dead end" of the friction unit assembly 10. It is provided with a link connecting device 14 which functions to pivotally fasten the "dead end" of the assembly 10 to the stationary mounting on the brake or clutch structure.

Pivotal interconnecting means 13 is made up of a connecting member 15 secured to section 12 and provided with a socket 16 formed therein to provide a pivotal axis disposed transversely of the end of shoe section 12. The bore of socket 16 is disposed radially inwardly of and overlies the end of section 12. Member 15 has an arm 17 extending outwardly beyond the end of section 12 and carries an abutment 18 which functions in a manner described hereinafter to limit retracting pivotal movement between sections 11 and 12. The arm 17 is further provided with a pair of apertures 19 and 20 through which extend the guide and retaining bolts 21 and 22. Bolts 21 and 22 are connected to the adjacent end of section 11 as described in more detail hereinafter. Helical compression springs 23 and 24 are disposed between the heads of bolts 21 and 22 respectively and the radially inwardly facing surface of arm 17.

A member 30 having connecting pin 31 is secured to the end of shoe section 11. Pin 31 is disposed outwardly beyond the end of section 11 overlying the adjoining end of section 12 and is pivotally engaged with socket 16. A tapped bore 32 is provided in pin 31 to threadably receive the end of bolt 21. Also a tapped bore 33 is provided in member 30 to threadably receive the end of the hereinabove referred to bolt 22. It will be seen that by threading these bolts into bores 32 and 33 the magnitude of force created by the compression of springs 23 and 24 may be altered as desired. As shown in the preferred embodiment, these bolts extend radially inwardly from the sections 11 and 12.

The spring 24 performs the primary function of urging arm 17 and abutment 18 carried thereby toward engagement with the radially inner surface of member 30 to assume the position shown in FIGURE 1. Thus, this spring tends to pivot shoe sections 11 and 12 to a relation wherein the circumferential arc of the friction unit assembly is at its smallest radius.

Spring 23 may be provided to assist in drawing the pin 31 to the radially innermost position in socket 16 as shown in FIGURE 1 and thereby position pin 31 in the portion of socket 16 remote from the radially inner surface of shoe section 12.

Reference will now to made to more specific details and explanation of the particular form of socket 16 with relation to pin 31 as shown more clearly in FIGURE 2. Pin 31 is shown as being cylindrical with a flat radially outer side 34. The pin also has an arcuately curved segment 35 which engages with socket 16 to pivotally interconnect the shoe sections.

The socket 16 has a first portion 36 remote from the radially inner surface 37 of the shoe section 12 and a second portion 38 which forms a guide surface to control movement of pin 31 within socket 16 during operation of the assembly.

The first portion 36 of the socket 16 is engaged by pin 31 in its retracted position as shown in FIGURE 1. The second portion 38 guides movement of the pin as the brake or clutch actuating force is applied to the "live end" of the friction unit assembly. As such force is applied and the assembly operated to move the lining L carried by the respective shoe sections into engagement with the drum, pin 31 slides along the arcuate configuration of portion 38 to a point where point A on pin 31, as shown on FIGURE 2, coincides with point B on socket 16 of FIGURE 2. In this actuated position, the force is transmitted circumferentially from shoe section 11 to shoe section 12 through member 30, pin 31, point A to point B and thence to member 15. Upon release of the brake or clutch actuating force, the springs 23 and 24 return the shoe sections to the relation as shown in FIGURE 1. It will be appreciated that as the actuating force is applied a combination pivoting and camming action occurs in the movements of pin 31 within socket 16.

The arcuate configuration of portion 38 of socket 16 is formed with a radius greater than the radius of the arcuately curved segment 35 on pin 31. Further, the center of this arcuate configuration 38 is disposed at point C which is spaced radially inwardly from the inner surface 37 of shoe section 12 less than a distance equal to the radius of this arcuate configuration. In other words, the arc of arcuate configuration 38 would extend, if projected into the surface of shoe section 12, along the dotted line D as illustrated in FIGURE 2. In the absence of recessing the end of shoe section 12 along line D, the radially outer portion of pin 31 is cut away to provide the flat side 34. Thus, upon actuation of the assembly, the pin 31 may move to a position where point A coincides with point B without pin 31 engaging the surface 37 of shoe section 12. It will be appreciated that the end of shoe section 12 may be recessed to accommodate pin 31 without its having a flat side where the degree of recessing would not unduly weaken the end of section 12.

Attention is also called to the relationship of the radially innermost point F on socket 16 to the shoe section 12. It has been found that for proper positioning of this point F radially inwardly from the inner periphery of shoe section 12 the following empirical relationship should exist.

Referring to FIGURE 1, a reference line G intersecting point F and perpendicular to a radius H is extended to intersect the inner periphery of shoe section 11. Line H is a radius of shoe sections 11 and 12, and extends through the end of shoe section 11 which carries member 30. A limit line I is drawn from the intersection of line G with the inner periphery of shoe section 11 parallel to radius H to intersect the outer periphery of shoe section 11. A direction line J is drawn from the intersection of limit line I with the outer periphery of shoe section 11 through point F. When point F on socket 16 is properly disposed with respect to shoe section 12 the line J, after it passes through point F will form an angle K of at least ninety degrees with a radius M. Radius M extends through point F from the center of curvature of shoe sections 11 and 12. With point F disposed in accordance with this empirical relationship, it has been found that the friction unit assembly will effectively operate upon the application of actuating force thereto without undesired inward buckling of the shoe section ends at the pivotal interconnecting means 13.

Referring more specifically to the link connecting device 14, such device includes a link 40 having a bore 41 adjacent one end thereof to pivotally cooperate with a pin P which is stationarily mounted on the brake or clutch structure. As is well recognized in brake and clutch structures, the provision of such a stationary mounting pin is conventional to pivotally support the "dead end" of the brake or clutch shoe which is to form a part of such structure. The opposite end of link 40 is provided with a pin 42. Intermediate bore 41 and pin 42 there is provided an abutment 43 which serves to limit movement of link 40 relative to shoe section 12 to which it is connected as described hereinafter.

A support 45 is secured adjacent the end of section 12 and has formed therein a socket 46 which pivotally receives the pin 42 on link 40. With the link connection device 14, positioned as shown in FIGURE 1, it will be seen that link 40 is pivotally connected at one end to stationary mounting pin P and pivotally connected at its other end to the adjacent end of shoe section 12.

A bore 50 is provided extending through link 40 and a bolt 51 extends freely through such bore and is threaded into a tapped hole 52 in the end of section 12. A spring 53 is engaged between the head of bolt 51 and the radially inner surface of link 40 to be compressed by threading bolt 51 into bore 52. Spring 53 thereby functions to urge abutment 43 into engagement with the end of section 12 to assume a position as shown in FIGURE 1 while separation of abutment 43 from section 12 is resisted by the compressing of spring 53.

Particular attention is called to the relationship of the pivot axis of pin P to the pivot axis of pin 42. As shown on the drawing, the pivot axis of pin 42 is positioned radially outwardly further than the pivot axis of pin P. By this relationship, as the brake or clutch actuating force is applied to the assembly, such force will tend to move link 40 further away from a position of parallelism with the end of shoe section 12 and thereby link 40 will carry the end of section 12 outwardly into engagement with the drum. Thus, abutment 43 will be separated from shoe section 12, with such separation being resisted by spring 53. The spring thereby gives controlled operation of the link connecting device such that upon release of the actuating pressure the device is returned to its relationship to shoe section 12 as shown in FIGURE 1.

It has been found that, by utilization of the spring controlled link connecting device 14, improved controlled braking or clutching action is achieved. It is particularly pointed out that support 45 and the pin 42 have a width such as to extend a substantial distance across the width of shoe section 12. The cooperation of elongated pin 42 in elongated socket 46 offers a strengthened pivotal support. This particular interconnection is especially important in avoiding side distortion or twisting movements of the shoe sections as characteristically result from the "belling" of the brake or clutch drum. Such "belling" apparently results as substantial brake or clutch pressure is applied to the friction unit assembly. This "belling" action is characterized by the outer open end of the drum distorting to a larger circumference while the inner end of the drum is retained at its original circumference by the body of the drum.

I claim:

1. In a brake or clutch structure, a friction unit assembly for selective engagement with a drum, said assembly including an arcuate shoe section adapted to have one end thereof connected to a stationary mounting pin, a link having a bore at one end thereof for engagement with the stationary pin to pivotally interconnect said link and pin, a pin member carried at the other end of said link and having its axis disposed transversely of said other end of said link, an abutment on said link adjacent said one end of said shoe section and between said bore end and said pin member to engage said one end of said shoe section upon movement of said link and said one end of said shoe section toward a position of parallelism, a support secured to said shoe section adjacent one end thereof, said support having a socket formed therein to provide a pivot axis disposed transversely of the end of said shoe section, said pin member being engaged in said socket to provide a pivotal connection extending across a substantial portion of the width of said section, and spring means cooperating with said link and said shoe section to urge said link toward a position of parallelism with said one end of said shoe section and said abutment into engagement with said one end of said shoe section.

2. In a brake or clutch structure, a friction unit assembly for selective engagement with a drum comprising first and second arcuate shoe sections, a connecting member carried at one end of said first shoe section and having a socket formed therein to provide a pivot axis disposed transversely of the end of said first shoe section, a connecting pin member carried at one end of said second shoe section and having its axis disposed transversely of the end of said second section, said connecting pin member having an arcuately curved segment engaged with said socket to pivotally interconnect said shoe sections in end to end relation, said socket having a first portion remote from the radially inner surface of said first shoe section and a second portion forming a guide surface to control movement of said pin member in said socket during operation of said assembly, said second portion of said socket having an arcuate configuration with a radius greater than the radius of said arcuately curved segment of said pin member and curving generally toward the radially inner surface of said first shoe section, spring means biasing said pin member to normally engage said first portion of said socket with the center of said arcuately curved segment spaced from the center of said arcuate configuration, and said arcuate configuration of said socket having the center thereof disposed at a point spaced radially inwardly from the inner surface of said shoe section less than the radius of said arcuate configuration.

3. In a brake or clutch structure, a friction unit assembly for selective engagement with a drum comprising first and second arcuate shoe sections, a connecting member carried at one end of said first shoe section and having a socket formed therein to provide a pivot axis disposed transversely of the end of said first shoe section, a connecting pin member engaged in said socket and carried at one end of said second shoe section with its axis disposed transversely of the end of said second section, the radially innermost point of engagement between said socket and said pin member being disposed on a reference line perpendicular to a radius of said shoe sections extending through the end of said second shoe section, said reference line intersecting the inner periphery of said second shoe section, a limit line extending between the inner and outer peripheries of said second shoe section parallel to said radius and including the point of intersection of said reference line with said inner periphery, and a direction line extending from the intersection of said limit line with the outer periphery of said second shoe section and through said radially innermost point, said direction line forming an angle of at least ninety degrees with a radius of said shoe sections which intersects said radially innermost point.

References Cited in the file of this patent

UNITED STATES PATENTS

| | | |
|---|---|---|
| 1,128,947 | Carter | Feb. 16, 1915 |
| 1,851,357 | Gunn | Mar. 29, 1932 |
| 2,287,023 | Carnes | June 23, 1942 |
| 2,723,016 | Goldberg | Nov. 8, 1955 |
| 2,731,115 | Hodgson | Jan. 17, 1956 |
| 2,778,470 | Goldberg | Jan. 22, 1957 |